(12) United States Patent
Liu et al.

(10) Patent No.: US 9,396,063 B2
(45) Date of Patent: Jul. 19, 2016

(54) STORAGE DEVICE AND OPERATING METHOD THEREOF

(71) Applicant: Macronix International Co., Ltd., Hsinchu (TW)

(72) Inventors: Ren-Shuo Liu, Taipei (TW); Meng-Yen Chuang, Hsinchu County (TW); Chia-Lin Yang, Taipei (TW); Cheng-Hsuan Li, Kaohsiung (TW); Kin-Chu Ho, Macau (CN); Hsiang-Pang Li, Zhubei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 143 days.

(21) Appl. No.: 14/276,002

(22) Filed: May 13, 2014

(65) Prior Publication Data

US 2015/0149867 A1    May 28, 2015

Related U.S. Application Data

(60) Provisional application No. 61/910,049, filed on Nov. 28, 2013.

(51) Int. Cl.
*G11C 29/00* (2006.01)
*G06F 11/10* (2006.01)

(52) U.S. Cl.
CPC ........ *G06F 11/1048* (2013.01); *G06F 11/1016* (2013.01)

(58) Field of Classification Search
None
See application file for complete search history.

(56) References Cited

U.S. PATENT DOCUMENTS

| | | | | |
|---|---|---|---|---|
| 6,662,334 | B1 * | 12/2003 | Stenfort | G11B 20/1833 714/769 |
| 6,959,412 | B2 * | 10/2005 | Silvus | G11B 20/1426 341/83 |
| 7,197,613 | B2 * | 3/2007 | Shibuya | G06F 11/004 711/100 |
| 8,495,465 | B1 * | 7/2013 | Anholt | H03M 13/29 714/763 |
| 2013/0173990 | A1 * | 7/2013 | Li | G11B 20/1833 714/763 |
| 2013/0311823 | A1 | 11/2013 | Kaplan et al. | |

OTHER PUBLICATIONS

TIPO Office Action dated Oct. 19, 2015 in corresponding Taiwan application (No. 103116199).

* cited by examiner

*Primary Examiner* — Daniel McMahon
(74) *Attorney, Agent, or Firm* — McClure, Qualey & Rodack, LLP

(57) ABSTRACT

An operating method of a storage device is provided. The operating method comprises the following steps. First, a first data is read from a target address of a first storage unit. Then, an assisting unit checks whether the target address is corresponding to a second data stored in a second storage unit. If the target address is corresponding to the second data, the assisting unit updates the first data according to the second data to generate an updated data. Next, an Error Correction Code (ECC) performs a decoding process on the updated data to generate a decoded data.

20 Claims, 7 Drawing Sheets

STORAGE DEVICE AND OPERATING METHOD THEREOF

This application claims the benefit of U.S. provisional application Ser. No. 61/910,049, filed Nov. 28, 2013, the subject matter of which is incorporated herein by reference.

TECHNICAL FIELD

The disclosure relates in general to a storage device and an operating method thereof, and more particularly to a storage device capable of speeding up the error detection and correction decoding process and an operating method thereof.

BACKGROUND

With the development of technology, non-volatile memory such as flash memory has been widely applied in various electronic products. For example, NAND flash-based solid-state disks (SSDs) are promising nowadays. Compared with traditional hard disk drives (HDDs), SSDs have advantages in small form factor, low power, and superior random read performance.

One main challenge in design flash memory is dealing with the bit error rate (BER). Flash memory is prone to bit errors, and the BER increases with more programming and erasing cycles. In such case, the memory controller needs to spend more time performing error detection and correction on the inputted data, and the decoding speed is reduced.

Therefore, there is a need for a storage device capable of speeding up the ECC decoding process of memory and an operating method thereof.

SUMMARY

The disclosure is directed to a storage device capable of speeding up the error checking and correction decoding process and an operating method thereof.

According to an aspect of the invention, an operating method of a storage device is provided. The operating method comprises the following steps. First, a first data is read from a target address of a first storage unit. Then, an assisting unit checks whether the target address is corresponding to a second data stored in a second storage unit. If the target address is corresponding to the second data, the assisting unit updates the first data according to the second data to generate an updated data, wherein the updated data has fewer errors than the first data. Next, an Error Correction Code (ECC) performs a decoding process on the updated data to generate a decoded data.

According to another aspect of the invention, a storage device is provided. The storage device comprises a first storage unit, a second storage unit, an assisting unit, and an Error Correction Code (ECC) decoder. The first storage unit is adapted to store a first data in a target address. The second storage unit is adapted to store a second data. The assisting unit is adapted to read the first data from the target address of the first storage unit, and to check whether the target address is corresponding to the second data stored in the second storage unit. If the target address is corresponding to the second data, the assisting unit updates the first data according to the second data to generate an updated data, wherein the updated data has fewer errors than the first data. The ECC decoder is adapted to perform an ECC decoding process on the updated data to generate a decoded data.

The above and other aspects of the invention will become better understood with regard to the following detailed description of the preferred but non-limiting embodiments. The following description is made with reference to the accompanying drawings.

Figure 1:
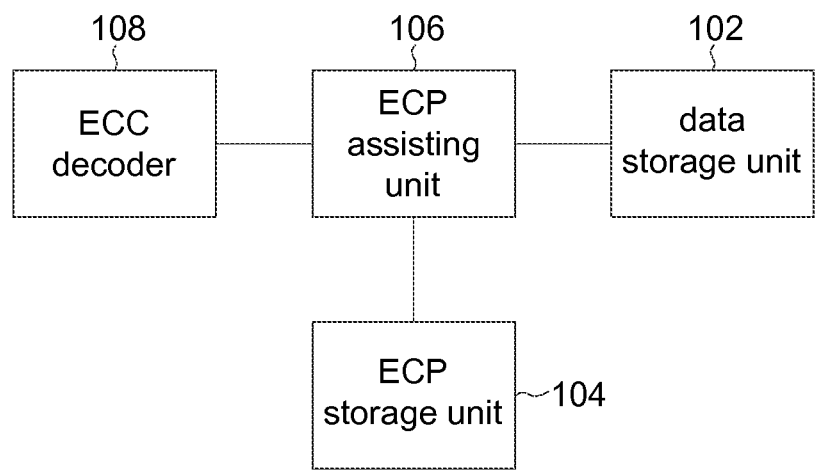
FIG. 1 illustrates a block diagram of a storage device according to an embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

A number of preferred embodiments are disclosed below for elaborating the details of the invention. However, the invention is not limited to the embodiments, and the embodiments are for elaborating the invention not for limiting the scope of protection of the invention. Moreover, secondary elements are omitted in the embodiments to highlight the characteristics of the invention.

Figure 2:
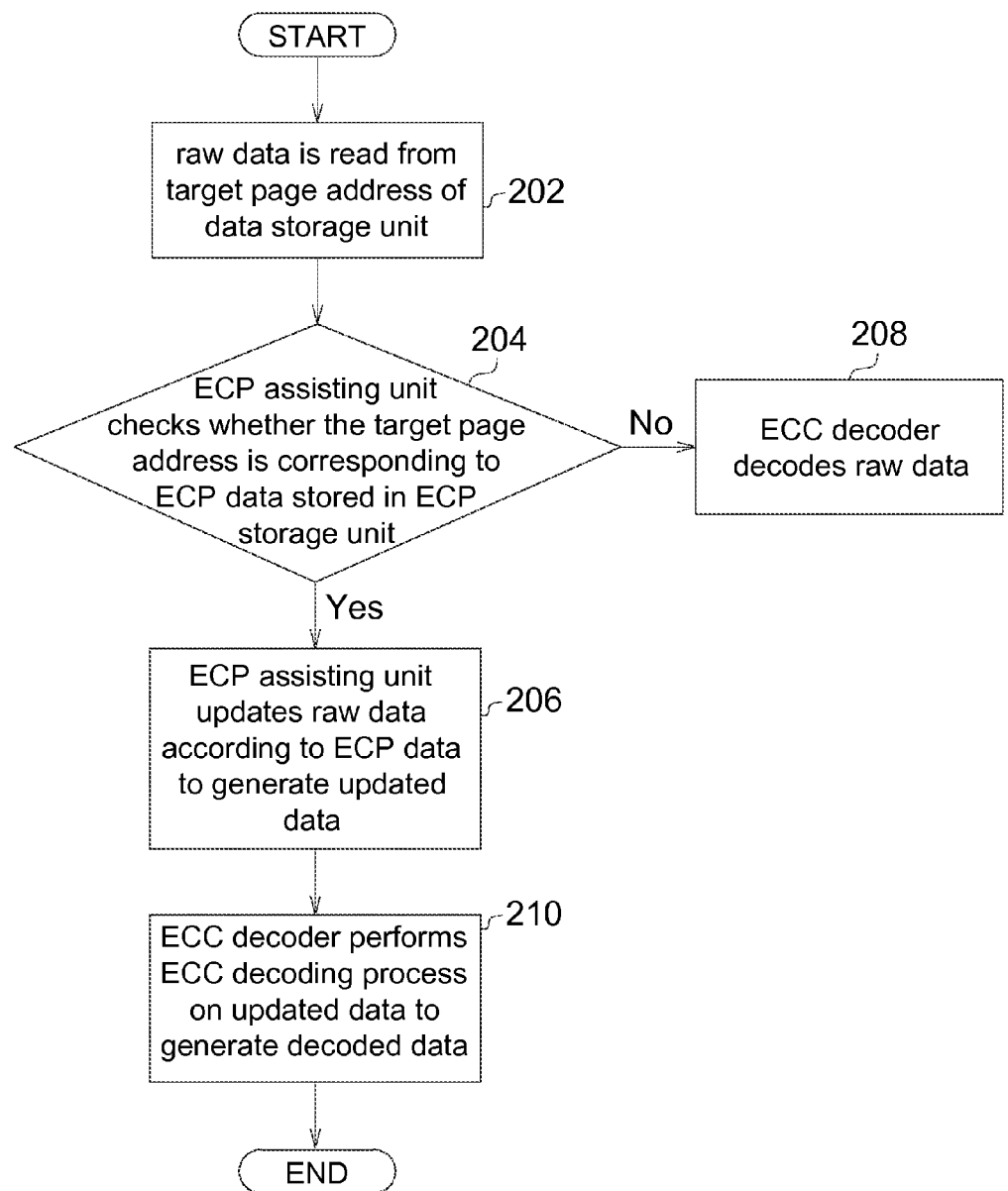
FIG. 2 illustrates a flow diagram for an operating method of the storage device.

FIG. 1 illustrates a block diagram of a storage device 100 according to an embodiment of the present invention. FIG. 2 illustrates a flow diagram for an operating method 200 of the storage device 100. The storage device 100 comprises a data storage unit 102, an error-correcting pointer (ECP) storage unit 104, an ECP assisting unit 106 and an error checking and correction (ECC) decoder 108. In the embodiment, the data storage unit 102 can be realized by, for example, a NAND flash memory, a phase-change memory (PCM), a magnetoresistive random access memory (MRAM), resistive random access memory (ReRAM) or other memory configurations. The ECP storage unit 104 can be realized by a cache memory, SRAM, any storage elements or can be implemented in the data storage unit 102. ECP assisting unit 106 can be realized by, for example, a micro processor, look-up-table or other circuits having computational capabilities. ECC decoder can be realized by, for example, a low-density parity-check (LDPC) decoder, a Bose-Chaudhuri-Hocquenhem (BCH) decoder or other soft-decision decoders.

At step 202, a raw data is read from a target page address of the data storage unit 102. At step 204, the ECP assisting unit 106 checks whether the target page address is corresponding to the ECP data stored in the ECP storage unit 104. If so, the step 206 is executed. The ECP assisting unit 106 updates the raw data according to the ECP data to generate an updated data. If not, the step 208 is executed. The ECC decoder 108 decodes the raw data.

At step 210, the ECC decoder 108 performs an ECC decoding process on the updated data to generate a decoded data. Since the number of error bits in the updated data is reduced compared to the number of error bits in the raw data, the ECC decoder 108 can spend less time performing error checking and correction on the updated data, and the decoding procedure gains speedup.

In the present embodiment, the number of error bits in the raw data can be reduced by the ECP data. This is because the Applicant found the error locality behavior of the memory. Table 1 shows an experiment that analyzes the error position of a page in a real flash memory. The experiment performs the following operations. First, a known random data is written into a block of the memory (Write 1), and one page (e.g., page i) of the block is read twice (Read 1 and Read 2). The two reads are separated by, for example, an hour. Then, the data of the block is erased (Erase 1), and another random data is written into the same block (Write 2). After that, the page i of the block is read twice again (Read 3 and Read 4).

TABLE 1

|  | Write 1 | Read 1 | Read 2 | Erase 1 | Write 2 | Read 3 | Read 4 |
|---|---|---|---|---|---|---|---|
| Error (#) |  | 716 | 725 |  |  | 713 | 701 |
| Same-position (#) |  | — | 559 |  |  | 34 | 553 |
| Same-position (%) |  | — | 77% |  |  | 4.8% | 79% |

As shown in Table 1, there are 716 bit errors presented in the first read (Read 1), and 725 bit errors presented in the second read (Read 2). For the second read, 559 out of the 725 errors are at the same positions as that of the first read. In this case, the error locality is 559/725 equal to 77%. Similarly, the error locality between the third read (Read3) and the fourth read (Read4) is 553/701 equal to 79%. Besides, since the page i of the memory is erased (Erase1) and rewritten (Write2), the error locality between the second read (Read2) and the third read (Read3) is merely 4.8%. In other words, if a flash page is not erased or rewritten, it shows error locality about 70% to 80% between two reads. Thus, the ECP data, which records the information of error bit positions, can be used to correct the raw data, and the errors in the raw data can then be significantly reduced.

Figure 3:
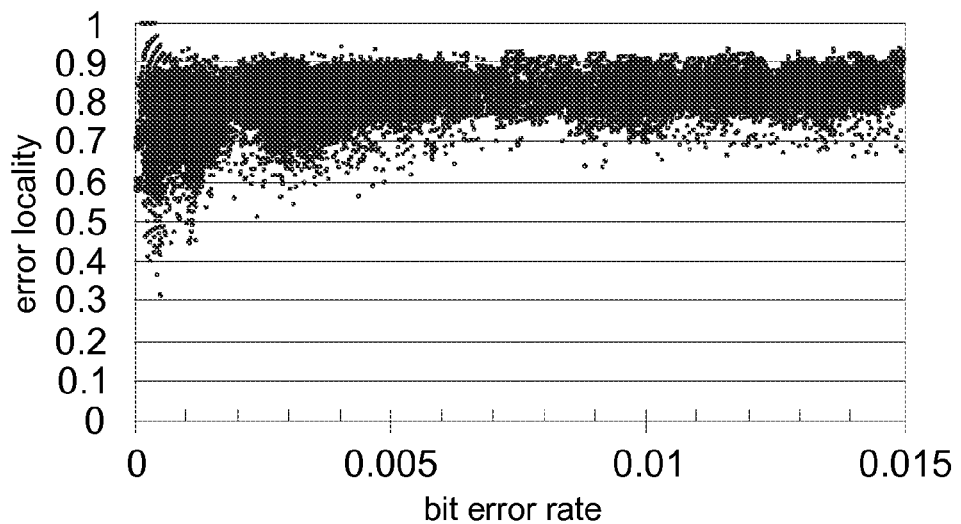
FIG. 3 illustrates the error locality of a 19 nm triple-level cell (TLC) NAND flash.

FIG. 3 illustrates the error locality of a 19 nm triple-level cell (TLC) NAND flash. It can be seen that the error locality is about 70% to 80% on average. Besides, when the bit error rate (BER) is lower than 0.005, the error locality has a higher variation. This is because with a low BER, more bits are caused by electrical noises.

Figure 4:
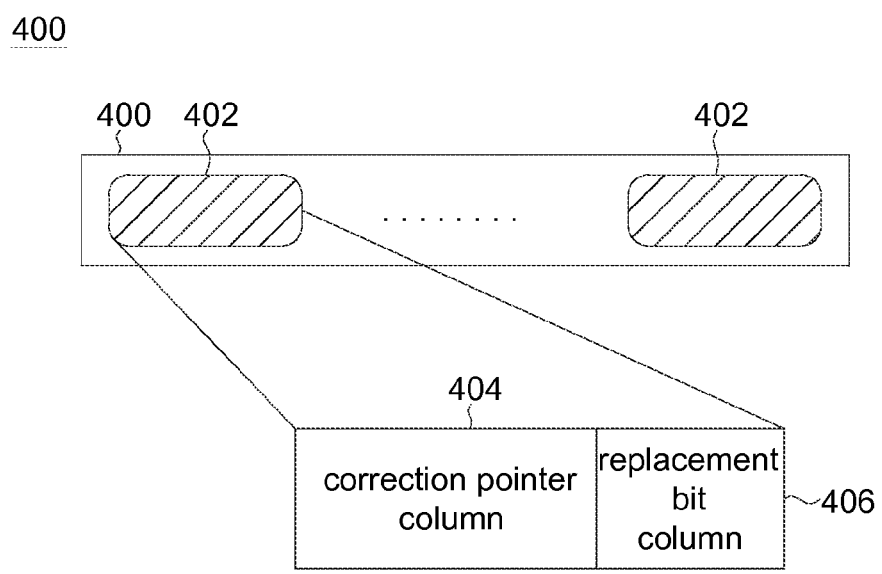
FIG. 4 illustrates an example of an ECP data.

FIG. 4 illustrates an example of an ECP data 400. As shown in FIG. 4, the ECP data comprises one or more ECP entries 402. Each ECP entry 402 comprises a correction pointer column 404 and a replacement bit column 406. The correction pointer column 404 indicates a position of an error bit. The replacement bit column 406 indicates a replacement bit used to replace the error bit. For example, if the fifth bit of a raw data is error, the corresponding ECP entry 402 is allocated for the error bit in the ECP data storage unit 104. The correction pointer column 404 of the ECP entry 402 is set to 5 to inform the ECP assisting unit 106 that reads to the fifth bit should be served by the replacement bit of the allocated ECP entry instead. In short, the ECP assisting unit 106 replaces a bit of the raw data corresponding to the position indicated by the correction pointer column 404 with the replacement bit.

Figure 5:
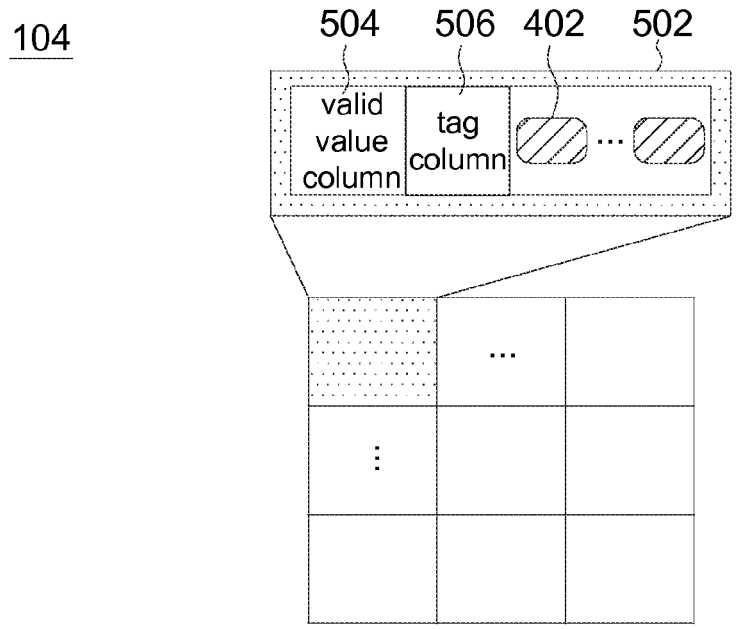
FIG. 5 illustrates an example of the ECP storage unit.

Referring to FIG. 5, an example of the ECP storage unit 104 is shown. As shown in FIG. 5, the ECP storage unit 104 comprises one or more cache lines 502 for storing the ECP entry 402. Each cache line 502 comprises a valid value column 504 and a tag column 506. The valid value column indicates whether the ECP entry 402 is valid. If the ECP entry 402 is invalid, the ECP assisting unit 402 does not use the ECP entry 402 to correct the raw data.

The tag column 506 indicates a tag value corresponding to a page address of the data storage unit 102. When a read for the data storage unit 102 occurs, the ECP assisting unit 106 searches the cache lines 502. If the corresponding cache line is found (i.e., the page address is corresponding to the tag column 506), the ECP entries 402 stored in cache line 502 are acquired and merged into the raw data to correct error bits in the raw data. In contrast, if the corresponding cache line 502 is not found, the raw data is decoded by the ECC decoder 108 directly.

After the ECC decoder 108 performs the ECC decoding process, the ECP assisting unit 106 generates a new ECP data based on errors found in the target page address until the total size of the generated ECP entries 402 exceeds a cache line 502 or all the detected errors are processed.

Figure 6A:
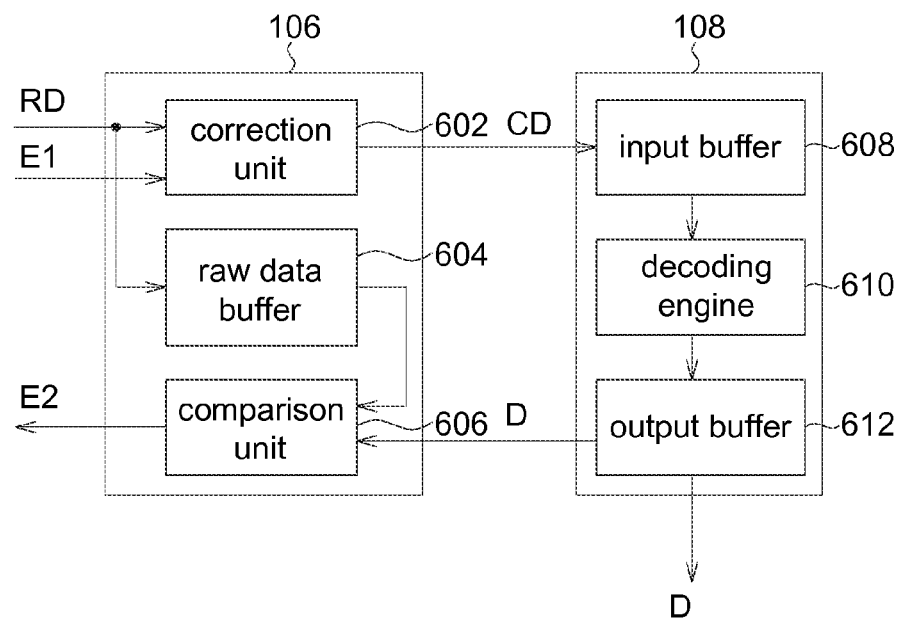
FIG. 6A illustrates a block diagram of the ECP assisting unit and the ECC decoder.

FIG. 6A illustrates an example of the ECP assisting unit 106 and the ECC decoder 108. The ECP assisting unit 106 comprises a correction unit 602, a raw data buffer 604 and a comparison unit 606. The correction unit 602 is adapted to merge the ECP data E1 into the raw data RD to generate the updated data CD. The raw data buffer 604 is adapted to temperately store the raw data RD. The comparison unit 606 is adapted to find the difference between the decoded data D and the raw data RD temperately stored in the raw data buffer 604 to generate a new ECP data E2. The new ECP data E2 is stored into the ECP storage unit 104, so the ECP data stored in the ECP storage unit 104 always keeps updated. Also, the new ECP data E2 can be merged with an old ECP data (i.e., the ECP data previously stored in the ECP storage unit 104) to generated a merged ECP data. The merged ECP data can then be stored into the ECP storage unit 104.

The ECC decoder 108 comprises an input buffer 608, a decoding engine 610 and output buffer 612. The input buffer 608 is adapted to temperately store the updated data CD received from the ECP assisting unit 106. The decoding engine 610 is adapted to decode the updated data CD to generate the decoded data D. The output buffer 612 is adapted to temperately store the decoded data D, and to provide the decoded data D to the comparison unit 606. In an example, the decoding engine 610 uses iterative algorithm to decode the updated data CD to generate corresponding decoded data D.

Figure 6B:
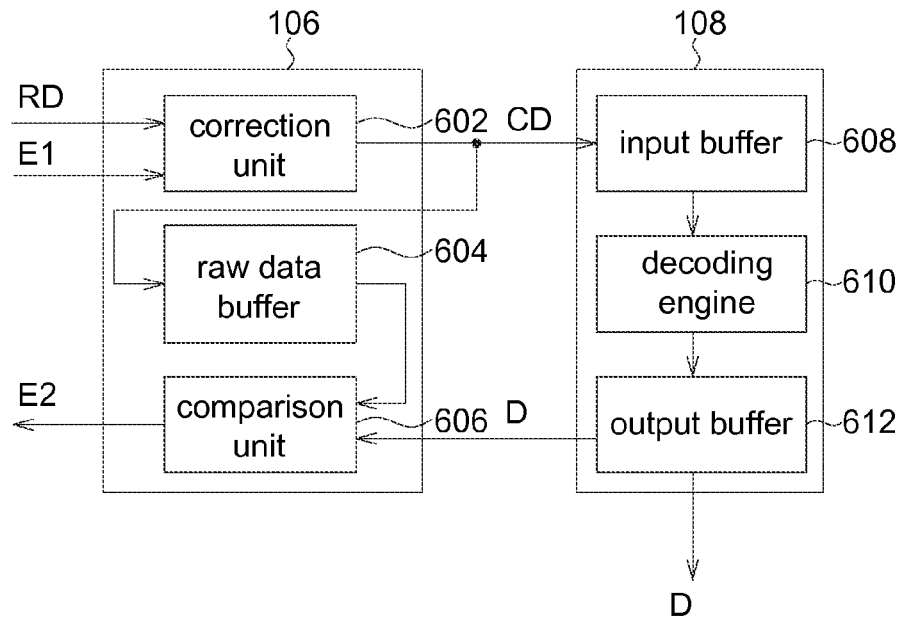
FIG. 6B illustrates a block diagram of the ECP assisting unit and the ECC decoder.

FIG. 6B illustrates another example of the ECP assisting unit 106 and the ECC decoder 108. In this example, the updated data CD outputted from the correction unit 602 is stored into the raw data buffer 604, so that the comparison unit 606 is adapted to find the difference between the decoded data D and the updated data CD temperately stored in the raw data buffer 604 to generate the new ECP data E2.

Figure 6C:
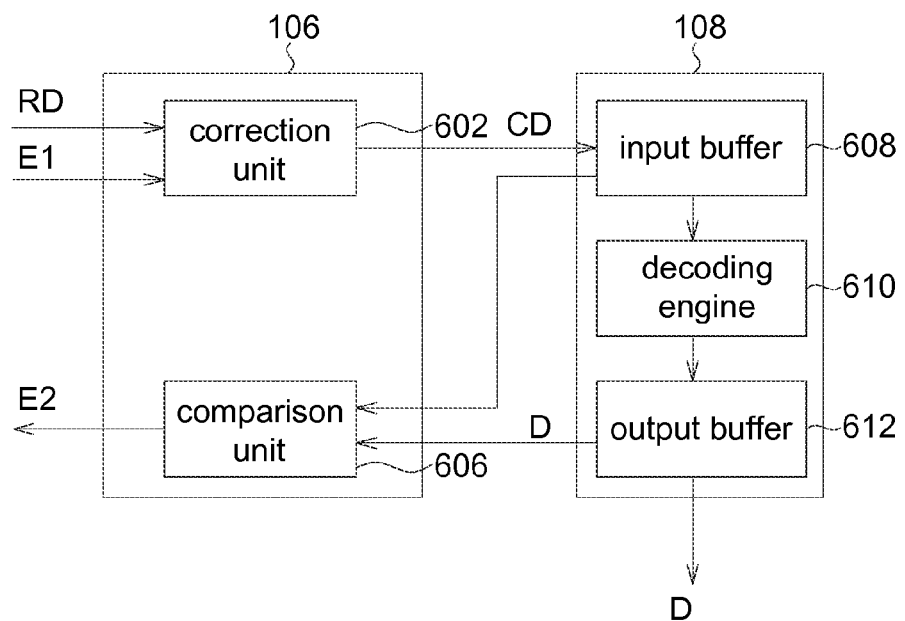
FIG. 6C illustrates a block diagram of the ECP assisting unit and the ECC decoder.

FIG. 6C illustrates another example of the ECP assisting unit 106 and the ECC decoder 108. In this example, the updated data CD temperately stored in the input buffer 608 is outputted to the comparison unit 606, so that the comparison unit 606 is adapted to find the difference between the decoded data D and the updated data CD temperately stored in the input buffer 608 to generate the new ECP data E2.

Figure 7:
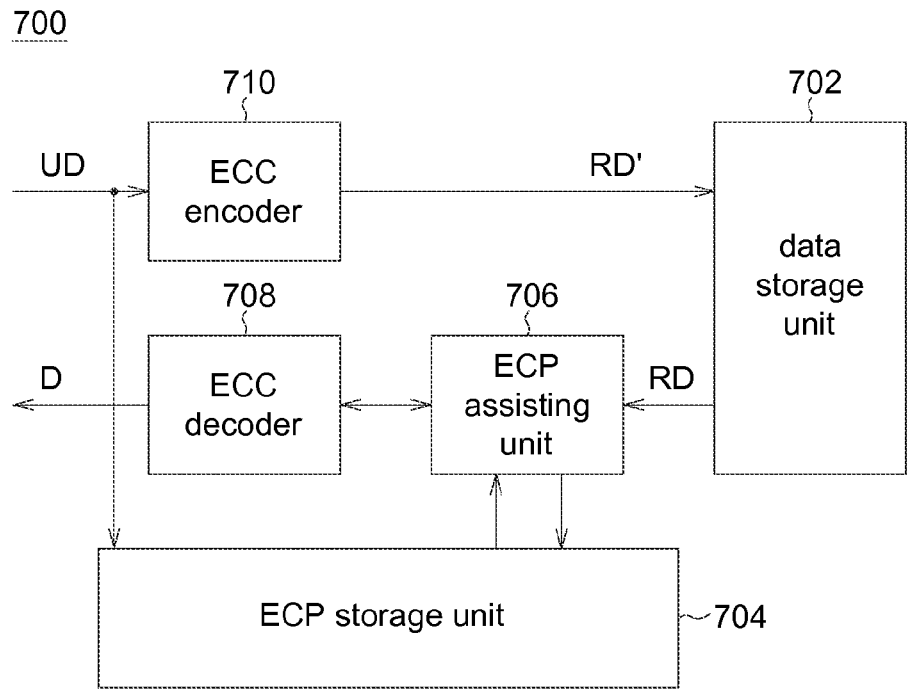
FIG. 7 illustrates a block diagram of a storage device according to another embodiment of the present invention.

FIG. 7 illustrates a block diagram of a storage device 700 according to another embodiment of the present invention. The storage device 700 comprises a data storage unit 702, an ECP storage unit 704, an ECP assisting unit 706, an ECC decoder 708 and an ECC encoder 710. The functions and structures of the data storage unit 702, the ECP storage unit 704, the ECP assisting unit 706 and the ECC decoder 708 are similar to the previous embodiment. The ECC encoder 710 is adapted to encode a user data UD to generate an encoded data RD'. For example, if the user data D' is written into the storage device 700, the ECC encoder 710 adds ECC codes in the user data UD, so that the ECC decoder 708 can perform error checking and correction according to the ECC codes.

In this embodiment, the ECC encoder 710 is adapted to encode a user data UD to be written to the page address of the data storage unit 702. If the corresponding cache line 502 is found, the valid value column of the cache line corresponding to the page address is set to be invalid. This is because the original ECP entries are no longer applicable to the newly written data.

Figure 8:
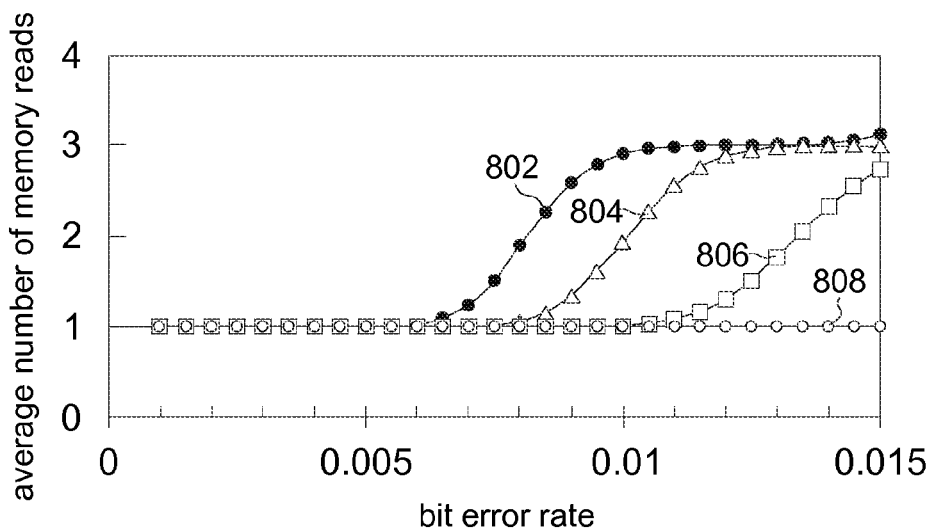
FIG. 8 illustrates the average number of memory reads required by the ECC decoder to decode a codeword with different ECP error-reduction-rates.

FIG. 8 illustrates the average number of memory reads required by the ECC decoder (LDPC decoder for example) to decode a codeword with different ECP error-reduction-rates (i.e., the ratio that the number of error bits reduced by the ECP data). The curves 802, 804, 806 and 808 are corresponding to the ECP error-reduction-rates of 0%, 20%, 40% and 60%, respectively. As can be seen from FIG. 8, with an ECP error-reduction-rate of 60%, the average number of memory reads is still close to one even if the memory BER is as high as 0.015.

Figure 9:
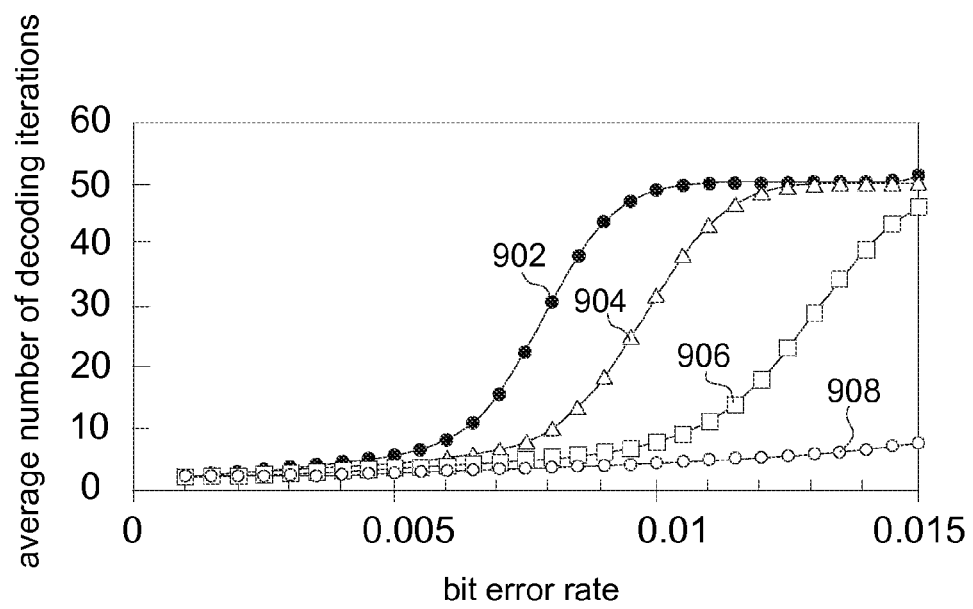
FIG. 9 illustrates the average number of decoding iterations required by the ECC decoder to decode a codeword with different ECP error-reduction-rates.

FIG. 9 illustrates the average number of decoding iterations required by the ECC decoder (LDPC decoder for example) to decode a codeword with different ECP error-reduction-rates. The curves 902, 904, 906 and 908 are corresponding to the ECP error-reduction-rates of 0%, 20%, 40% and 60%, respectively. As can be seen from FIG. 9, with an ECP error-reduction-rate of 60%, the ECC decoder can successively decode a codeword even if the memory BER is as high as 0.015.

Based on the above, the storage device of the present invention can correct bit errors in the raw data before the decoding process if the corresponding ECP data can be found, so the ECC decoder can spend less time performing error checking and correction on the data, and the decoding procedure gains speedup.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An operating method of a storage device, comprising:
   reading a first data from a target address of a first storage unit;
   checking whether the target address is corresponding to a second data in a second storage unit by an assisting unit;
   if the target address corresponds to the second data, updating, before the first data is decoded, the first data according to the second data to generate an updated data by the assisting unit, wherein the updated data has fewer errors than the first data; and
   performing an error correction code (ECC) decoding process on the updated data to generate a decoded data by an ECC decoder.

2. The operating method according to claim 1, further comprising:
   if the target address is not corresponding to the second data, decoding the first data by the ECC decoder.

3. The operating method according to claim 1, wherein the second data comprises an error-correcting pointer (ECP) entry comprising a correction pointer column and a replacement bit column, the correction pointer column is used for indicating a position of a bit and the replacement bit column is used for indicating a replacement bit used to replace the bit, the operating method further comprises:
   replacing a bit of the first data corresponding to the position indicated by the correction pointer column with the replacement bit.

4. The operating method according to claim 3, wherein the second storage unit comprises a cache line for storing the second data, the cache line comprises:
   a valid value column for indicating whether the second data is valid;
   a tag column for indicating a tag value corresponding to an address of the first storage unit;
   wherein the assisting unit further determines whether the second data is valid and uses the second data to update the first data when the second data is determined to be valid.

5. The operating method according to claim 4, further comprising:
   writing a user data, wherein the user data is to be written to the address of the first storage unit;
   encoding the user data by an ECC encoder; and
   setting the valid value column of the cache line corresponding to the address of the first storage unit to be invalid in response to writing the user data to the address of the first storage unit.

6. The operating method according to claim 1, further comprising:
   after performing the ECC decoding process on the updated data, generating a third data based on errors found in the target address.

7. The operating method according to claim 1, wherein the assisting unit comprises a correction unit, a buffer and a comparison unit,
   said updating the first data according to the second data to generate the updated data is performed by the correction unit,
   the operating method further comprises:
   storing the first data into the buffer;
   finding a plurality of differences between the decoded data and the first data stored in the buffer to generate a third data by the comparison unit, wherein the third data contains at least one of the plurality of differences, and
   storing the third data into the second storage unit to replace the second data.

8. The operating method according to claim 7, wherein the ECC decoder comprises an input buffer, a decoding engine and an output buffer, the operating method further comprises:
   storing the updated data received from the assisting unit into the input buffer;
   decoding the updated data to generate the decoded data by the decoding engine; and
   storing the decoded data into the output buffer, and outputting the decoded data from the output buffer to the comparison unit.

9. The operating method according to claim 1, wherein the assisting unit comprises a correction unit, a buffer, and a comparison unit,
   said updating the first data according to the second data to generate the updated data is performed by the correction unit, the operating method further comprises:
   storing the updated data into the buffer,
   finding a plurality of differences between the decoded data and the updated data stored in the buffer to generate a third data by the comparison unit, wherein the third data comprises at least one of the plurality of differences,
   merging the second data with the third data to generate a fourth data, and
   storing the fourth data into the second storage unit to replace the second data.

10. The operating method according to claim 1, wherein the ECC decoder is realized by a low-density parity-check (LDPC) decoder, or a Bose-Chaudhuri-Hocquenhem (BCH) decoder.

11. A storage device, comprising:
   a first storage unit, for storing a first data in a target address;
   a second storage unit, for storing a second data;
   an assisting unit, for reading the first data from the target address of the first storage unit, and checking whether the target address is corresponding to the second data stored in the second storage unit, wherein if the target address corresponds to the second data, the assisting unit updates, before the first data is decoded, the first data according to the second data to generate an updated data that contains fewer errors than the first data; and
   an error correction code (ECC) decoder, for performing an ECC decoding process on the updated data to generate a decoded data.

12. The storage device according to claim 11, wherein if the address is not corresponding to the second data, the ECC decoder decodes the first data.

13. The storage device according to claim 11, wherein the second data comprises an error-correcting pointer (ECP) entry, the ECP entry comprises:
   a correction pointer column for indicating a position of a bit; and
   a replacement bit column for indicating a replacement bit used to replace a error bit;
   wherein the assisting unit replaces a bit of the first data corresponding to the position indicated by the correction pointer column with the replacement bit.

14. The storage device according to claim 11, wherein the second storage unit comprises a cache line for storing the second data, the cache line comprises:
   a valid value column for indicating whether the second data is valid;
   a tag column for indicating a tag value corresponding to an address of the first storage unit;
   wherein the assisting unit further determines whether the second data is valid and uses the second data to update the first data when the second data is determined to be valid.

15. The storage device according to claim 14, further comprising:
   an ECC encoder for encoding a user data to be written to the address of the first storage unit;
   wherein the valid value column of the cache line corresponding to the address is set to be invalid in response to writing the user data to the address of the first storage unit.

16. The storage device according to claim 11, wherein after the ECC decoder performs the ECC decoding process on the updated data, the assisting unit generates a third data based on errors found in the target address.

17. The storage device according to claim 11, wherein the assisting unit comprises:
   a correction unit for merging the second data into the first data to generate the updated data;
   a buffer for storing the first data or the updated data; and
   a comparison unit for finding a plurality of differences between the decoded data and the first data stored in the buffer to generate a third data that comprises at least one of the plurality of differences;
   wherein the third data or a fourth data is stored into the second storage unit to replace the second data, wherein the fourth data is related to both the third data and the second data.

18. The storage device according to claim 17, wherein the ECC decoder comprises:
   an input buffer for storing the updated data received from the assisting unit;
   a decoding engine for decoding the updated data to generate the decoded data; and
   an output buffer for storing the decoded data, and providing the decoded data to the comparison unit.

19. The storage device according to claim 11, wherein the assisting unit comprises:
   a correction unit for merging the second data into the first data to generate the updated data;
   a buffer for storing the first data or the updated data; and
   a comparison unit for finding a plurality of differences between the decoded data and the updated data stored in the buffer to generate the third data that comprises at least one of the plurality of differences;
   wherein the third data or a fourth data is stored into the second storage unit to replace the second data, wherein the fourth data is related to both the third data and the second data.

20. The storage device according to claim 11, wherein the ECC decoder is realized by a low-density parity-check (LDPC) decoder or a Bose-Chaudhuri-Hocquenhem (BCH) decoder.

* * * * *